UNITED STATES PATENT OFFICE.

CARL ALBERT KERN, OF MILL VALLEY, CALIFORNIA.

FRUIT-JUICE PRODUCT.

1,204,881.

Specification of Letters Patent. Patented Nov. 14, 1916.

No Drawing. Application filed September 23, 1916. Serial No. 121,767.

*To all whom it may concern:*

Be it known that I, CARL ALBERT KERN, a citizen of the United States, and a resident of Mill Valley, Marin county, State of California, have invented a new and useful Fruit-Juice Product, of which the following is a specification.

The invention relates to a product containing preserved fruit juices.

An object of the invention is to provide a product from which fruit juices may be extracted in their natural state and flavor.

A further object of the invention is to provide a dry product from which the natural fruit juices may be extracted by the addition thereto of water.

The product consists of a dried mixture of fruit juice and a material which is not acted on by the juice to produce water soluble compounds, preferably cellulose material, such as paper pulp.

The fresh fruit juice which has been extracted from the fruit by pressure or other means, is first filtered to remove any fruit particles. To the juice I add a quantity of substantially pure cellulose material and heat the mixture gently to dryness. The cellulose material is sterile and is not decomposed by the evaporated fruit juice and the amount of cellulose material added is preferably from 1% to 2% of the original amount of fruit juice.

The dry product can be kept for any length of time and can be easily stored or transported. When the fruit juice is to be used, the evaporated amount of water is added to a cake or package contents of the product, to dissolve the dehydrated fruit juice and the cellulose material is then removed by straining or otherwise. The strained liquid contains the fruit juice in its natural content and flavor.

I claim:

1. As a new article of manufacture, a mixture of dry fruit juice and cellulose material.

2. As a new article of manufacture, a mixture of dry fruit juice and a material which is not acted on by the juice to form water soluble compounds.

3. As a new article of manufacture, a mixture of dry fruit juice and a water insoluble material.

4. As a new article of manufacture, a product from which fruit juice may be recovered in its natural state by the addition of water thereto, comprising a mixture of dry fruit juice and cellulose material.

In testimony whereof, I have hereunto set my hand at San Francisco, California, this 16th day of September, 1916.

CARL ALBERT KERN.

In presence of—
H. G. PROST.